United States Patent
Baumgart et al.

(10) Patent No.: US 7,581,779 B2
(45) Date of Patent: Sep. 1, 2009

(54) MOTOR VEHICLE DOOR

(75) Inventors: Rainer Baumgart, Fellbach (DE);
Richard Käfer, Löchgau (DE);
Reimund Schlachter, Muehlacker (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 0 days.

(21) Appl. No.: 12/166,361

(22) Filed: Jul. 2, 2008

(65) Prior Publication Data
US 2009/0015035 A1    Jan. 15, 2009

(30) Foreign Application Priority Data
Jul. 13, 2007    (DE) .................. 10 2007 032 651

(51) Int. Cl.
*B60J 5/04* (2006.01)
(52) U.S. Cl. .............. 296/146.5; 296/146.6; 49/502
(58) Field of Classification Search .......... 296/146.5, 296/146.6; 49/502
See application file for complete search history.

(56) References Cited

U.S. PATENT DOCUMENTS

| 6,302,473 B1 * | 10/2001 | Weber ............ 296/146.6 |
| 6,732,474 B1 | 5/2004 | Eck et al. |
| 2002/0073627 A1 | 6/2002 | Hock |
| 2004/0195860 A1 | 10/2004 | Koellner et al. |

FOREIGN PATENT DOCUMENTS

| DE | 4008111 A1 | 9/1991 |
| DE | 4321282 A1 | 1/1995 |
| DE | 29613472 U1 | 11/1996 |
| DE | 19616788 A1 | 11/1997 |
| DE | 19727010 A1 | 1/1999 |
| DE | 19920841 A1 | 11/2000 |
| DE | 10063417 A1 | 7/2002 |
| DE | 10126250 A1 | 12/2002 |
| EP | 1 093 948 B1 | 4/2001 |

OTHER PUBLICATIONS

German Search Report dated Sep. 22, 2008.

* cited by examiner

*Primary Examiner*—Joseph D Pape
(74) *Attorney, Agent, or Firm*—Laurence A. Greenberg; Werner H. Stemer; Ralph E. Locher

(57) ABSTRACT

A motor vehicle door has an outer module and an inner module. The outer module contains an outer panel and an inner frame part to which an impact support and hinges can be fixed. For the motor vehicle door to have a simplified configuration and a low weight while having a high degree of rigidity, the inner frame part of the outer module is formed by a single-piece diecast part made of a metal alloy. The inner module contains an upper encircling window frame and a lower assembly support sheet. The upper window frame is configured as a single-piece diecast part made of a metal alloy. A lower frame part of the upper window frame is connected to the upper border region of the assembly support sheet with a longitudinally running hollow support being formed, and the upper window frame is connected locally to the inner frame part.

11 Claims, 10 Drawing Sheets

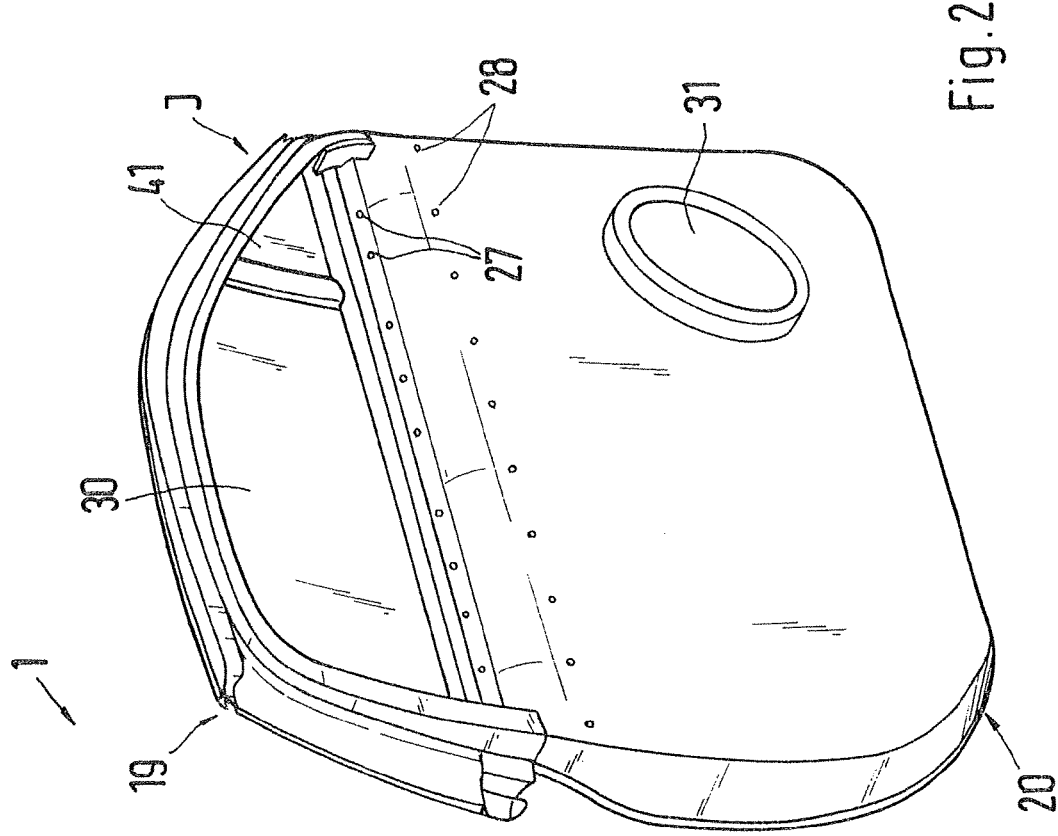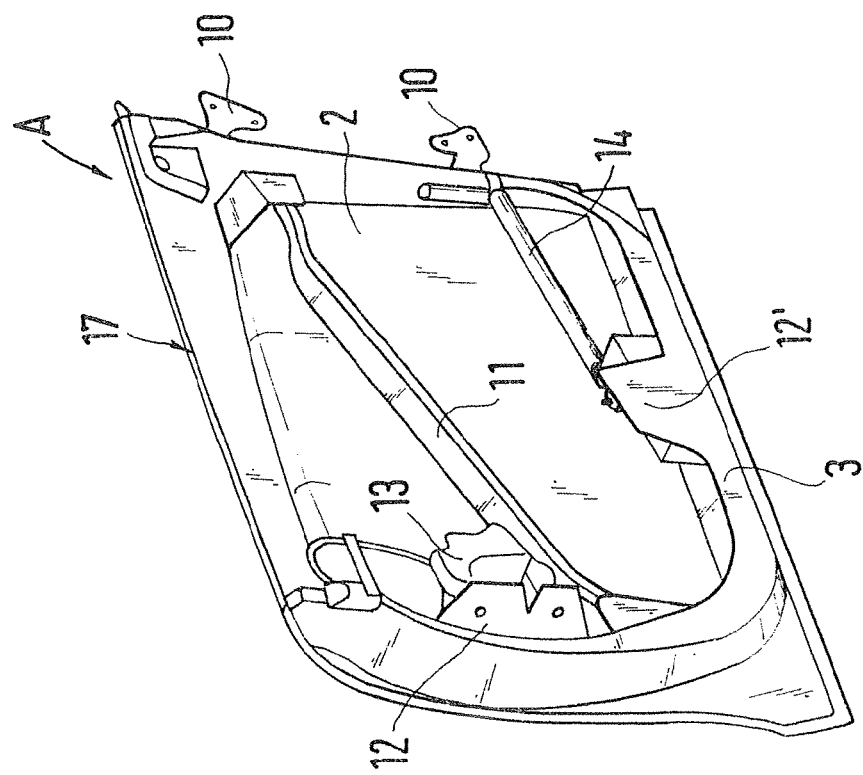
Fig. 2

MOTOR VEHICLE DOOR

CROSS-REFERENCE TO RELATED APPLICATION

This application claims the priority, under 35 U.S.C. § 119, of German application DE 10 2007 032 651.5, filed Jul. 13, 2007; the prior application is herewith incorporated by reference in its entirety.

BACKGROUND OF THE INVENTION

Field of the Invention

The invention relates to a motor vehicle door. European Patent EP 1 093 948 B1, corresponding to U.S. Pat. No. 6,732,474, discloses a motor vehicle door which has an outer module and an inner module. The outer module and the inner module can be connected to each other by screwing, riveting, adhesive bonding or the like. The outer module contains an outer panel and an inner frame part to which an impact support and hinges can be fixed. The inner module has accommodation options for door assemblies, such as, for example, a window pane, a pane actuator, speakers or the like.

In the case of this door, which is manufactured in a frame-type construction, both the outer panel and the inner frame part of the outer module are formed by sheet-metal pressed parts made of steel sheet. The inner module is assembled from a supporting door frame and an extensive assembly support sheet connected locally thereto. The supporting door frame contains an upper, curved window frame, an approximately horizontally oriented frame part running level with the window breast, and a lower frame part of approximately U-shaped configuration, with all of the parts of the supporting door frame being formed by light metal alloy extruded profiles which are welded to one another.

A motor vehicle door of this type is distinguished by good functioning and, furthermore, has a high degree of rigidity. However, the manufacturing of the multi-part, supporting door frame is complicated and cost-intensive. In addition, the supporting door frame has a considerable weight.

SUMMARY OF THE INVENTION

It is accordingly an object of the invention to provide a motor vehicle door which overcome the above-mentioned disadvantages of the prior art devices of this general type, which can be produced more simply and has a lower weight while having a comparable degree of rigidity.

With the foregoing and other objects in view there is provided, in accordance with the invention, a motor vehicle door. The door contains releasable connecting elements and an outer module having an outer panel, an inner frame part, an impact support affixed to the inner frame part, and hinges affixed to the inner frame part. The inner frame part is a single-piece die cast part made of a metal alloy. An inner module is connected to the outer module by screwing, riveting, or adhesive bonding. The inner module includes accommodation options for door assemblies, a window pane, a pane actuator, and speakers; and an upper encircling window frame being a single-piece diecast part made of a metal alloy. The upper window frame is connected locally to the inner frame part via the releasable connecting elements. A lower assembly support sheet is connected to the upper encircling window frame. The lower assembly support sheet is a baking-sheet-shaped assembly support sheet having an upper border region. The upper encircling window frame has a lower frame part connected to the upper border region of the lower assembly support sheet and defines a longitudinally running hollow support between the lower frame part and the upper border region.

The advantages primarily obtained by the invention are to be seen in the fact that a lightweight motor vehicle door of simple configuration is provided by use of a respective extensive, frame-shaped diecast part made of a light metal alloy for the inner frame part and the upper window frame. The motor vehicle door has a high degree of rigidity provided by the frictional connection of the two diecast parts and the special connection of the assembly support sheet to the upper window frame. Connections for door locks, for a door stop holder, for a door-stiffening device, for door hinges and the like can be integrated in a simple manner into the diecast parts, and therefore the number of components required for the motor vehicle door is substantially reduced. All of the essential parts of the outer module and of the inner module are preferably manufactured from a light metal alloy, as a result of which a particularly lightweight motor vehicle door is provided. When the door window pane is closed, it lines the window frame situated behind it by its arrangement which is flush with the outer skin, which is stylistically advantageous.

In accordance with an added feature of the invention, the inner frame part is manufactured from an aluminum alloy or a magnesium alloy. The inner frame part has integrated receptacles for a door lock, door hinges, and/or the impact support. The inner frame part has locally angled connecting tabs for supporting and fastening the assembly support sheet.

In accordance with an additional feature of the invention, the upper encircling window frame is formed by a die cast part made of a magnesium alloy. The inner module further has a triangular window with a vertical guide rail inserted into an opening in the upper encircling window frame and is connected to the upper encircling window frame. The upper encircling window frame has an upper frame part with a web; and the inner module has a decorative strip running along the upper frame part and connected to the web of the upper frame part. The upper encircling window frame has a profiled rear frame part. The inner module further has a door window pane, and a cover with an integrated guide rail for receiving the door window pane. The cover is disposed flush with an outer skin and is placed onto the profiled rear frame part of the window frame.

In accordance with another feature of the invention, the upper border region of the assembly support sheet is connected via two spaced-apart rivet rows to a horizontally oriented, lower frame part of the window frame and both parts define the longitudinally running hollow support.

In accordance with a further feature of the invention, there is an interior door molding and fastening screws. The assembly support sheet is connected to the inner frame part via the fastening screws. The fastening screws are disposed at a distance from an outer border of the assembly support sheet and being covered by the interior door molding.

In accordance with a concomitant feature of the invention, the outer panel is formed by a sheet of aluminum alloy being approximately 0.8 to 1.5 mm thick. The outer panel has a border side connected to an outer border of the inner frame part by one of crimping and adhesive bonding.

Other features which are considered as characteristic for the invention are set forth in the appended claims.

Although the invention is illustrated and described herein as embodied in a motor vehicle door, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a diagrammatic, exploded perspective view of the inside of an outer module and an inner module of the motor vehicle door;

DETAILED DESCRIPTION OF THE INVENTION

Figure 1:
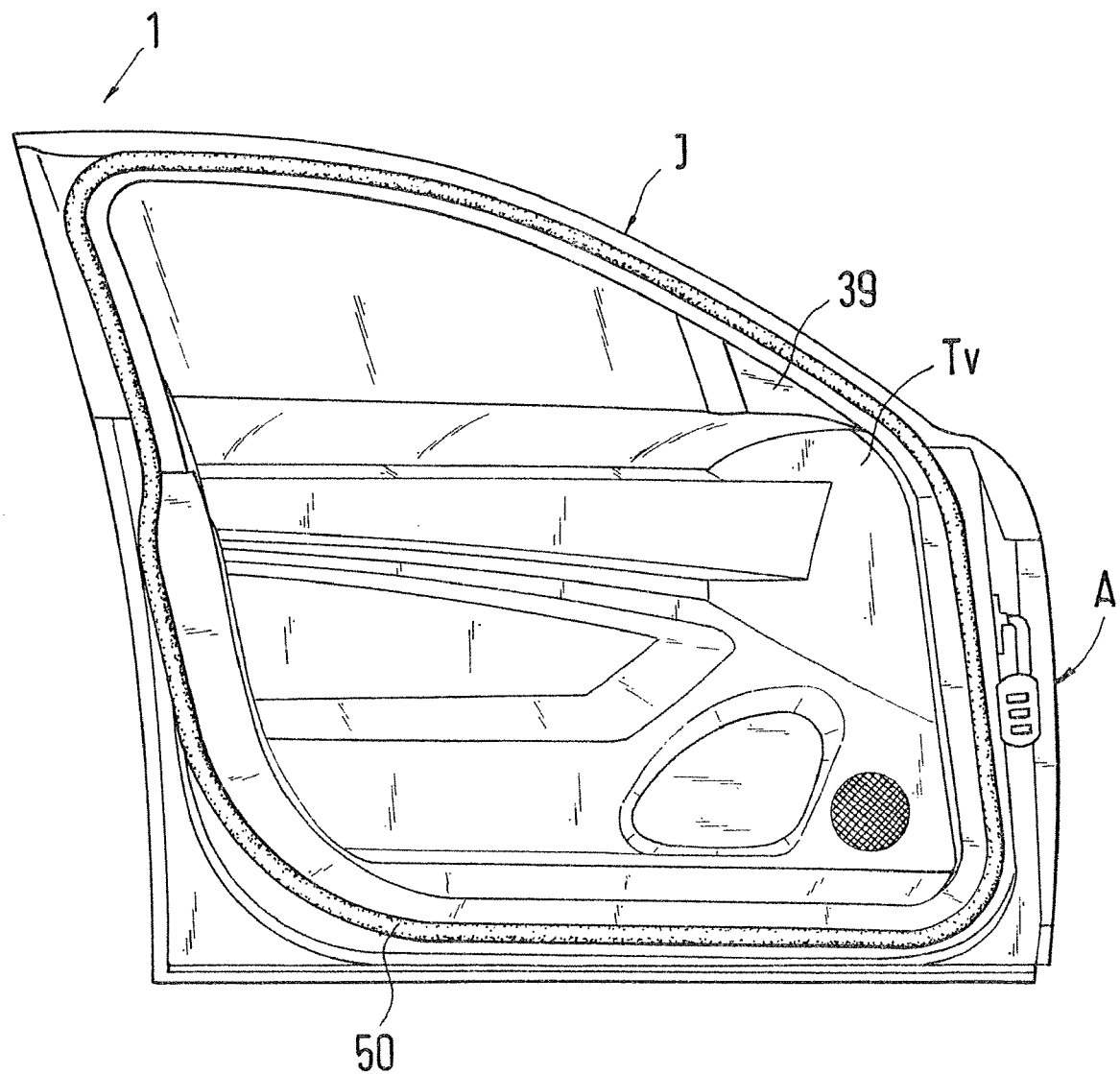
FIG. 1 is a diagrammatic, side inner view of a left, front door of a motor vehicle according to the invention.

Referring now to the figures of the drawing in detail and first, particularly, to FIG. 1 thereof, there is shown a motor vehicle door 1 which is manufactured in a modular construction and contains an outer module A, an inner module I and an interior door molding Tv. The premanufactured outer module A and the premanufactured inner module I are locally connected to each other by screwing, riveting, adhesive bonding or the like. In the exemplary embodiment, a left, front door of a motor vehicle is illustrated. Rear doors of the motor vehicle may likewise have an identical door configuration.

Figure 4:
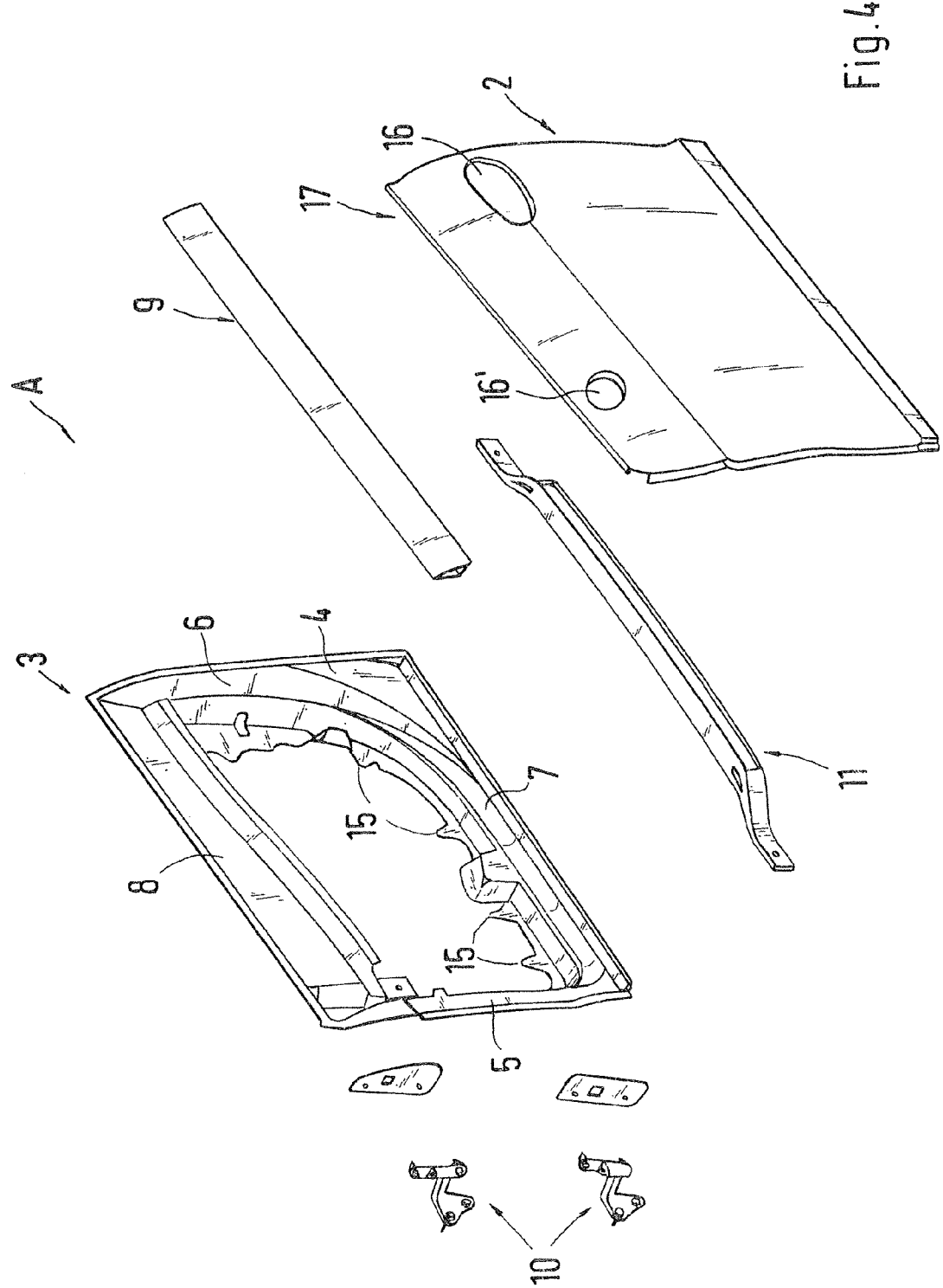
FIG. 4 is a diagrammatic, exploded perspective view of the individual components of the outer module.

According to FIGS. 2 and 4, the outer module A generally contains an outer panel 2 and an encircling, inner frame part 3. The inner frame part 3 is formed by a single-piece diecast part 4 made of a light metal alloy, for example of an aluminum or magnesium alloy. In the exemplary embodiment, the inner frame part 3 is composed of an aluminum alloy. The encircling inner frame part 3 is assembled from a front, upright subregion 5, a rear, upright subregion 6, a lower subregion 7 and an upper subregion 8. The upper subregion 8 and the lower subregion 7 are oriented approximately horizontally. All of the subregions 5 to 8 of the inner frame 3 each have a profiled cross-sectional shape. On the side facing the outer panel 2, the upper subregion 8 is provided with a well-type reinforcement 9 which is formed by an extruded profile, with the well-type reinforcement 9 being connected to the frame part 3, for example, by screw fastenings.

Hinges 10 and a diagonally running impact support 11 can be fixed to the inner frame part 3. Furthermore, receptacles 12, 12' which are integrally formed on the inner frame part 3 and are intended for a door lock 13 and a door stop 14 are provided, the receptacle 12 being assigned to the door lock 13 and the receptacle 12' being assigned to a door stop 14. Furthermore, the inner frame part 3 has locally provided, angled connecting tabs 15 for supporting and fastening the inner module I.

In the exemplary embodiment, the outer panel 2 is formed by a sheet of aluminum alloy which is approximately 0.8 mm to 1.5 mm thick and the border side of which is connected to the outer border of the inner diecast frame part 3 by crimping, adhesive bonding or the like. However, the outer panel 2 could also be formed by a plastic part which is connected to the inner frame part 3. The outer panel has an opening 16 into which a non-illustrated outside door actuation can be inserted. A mirror foot of a non-illustrated exterior mirror can be guided through a further opening 16' in the outer panel.

The receptacle 12 for the door lock 13 is provided on the rear subregion 6 whereas the receptacle 12' for the door stop 14 is formed on the lower subregion 7. The two hinges 10 are fastened to the upright, front subregion 5 of the inner frame part 3. An upper border 17 of the outer module A runs level with a belt line 18 of the motor vehicle.

The inner module I of the motor vehicle door 1 essentially contains an upper encircling window frame 19 and a lower assembly support sheet 20 which is connected to the latter and is configured in the manner of a baking sheet. The upper window frame 19 is formed by a single-piece diecast part 21 made of a light metal alloy. In the exemplary embodiment, the single-piece diecast part 21 is manufactured from a magnesium alloy. However, the window frame 19 could also be formed by a diecast part 21 made of an aluminum alloy.

Figure 6:
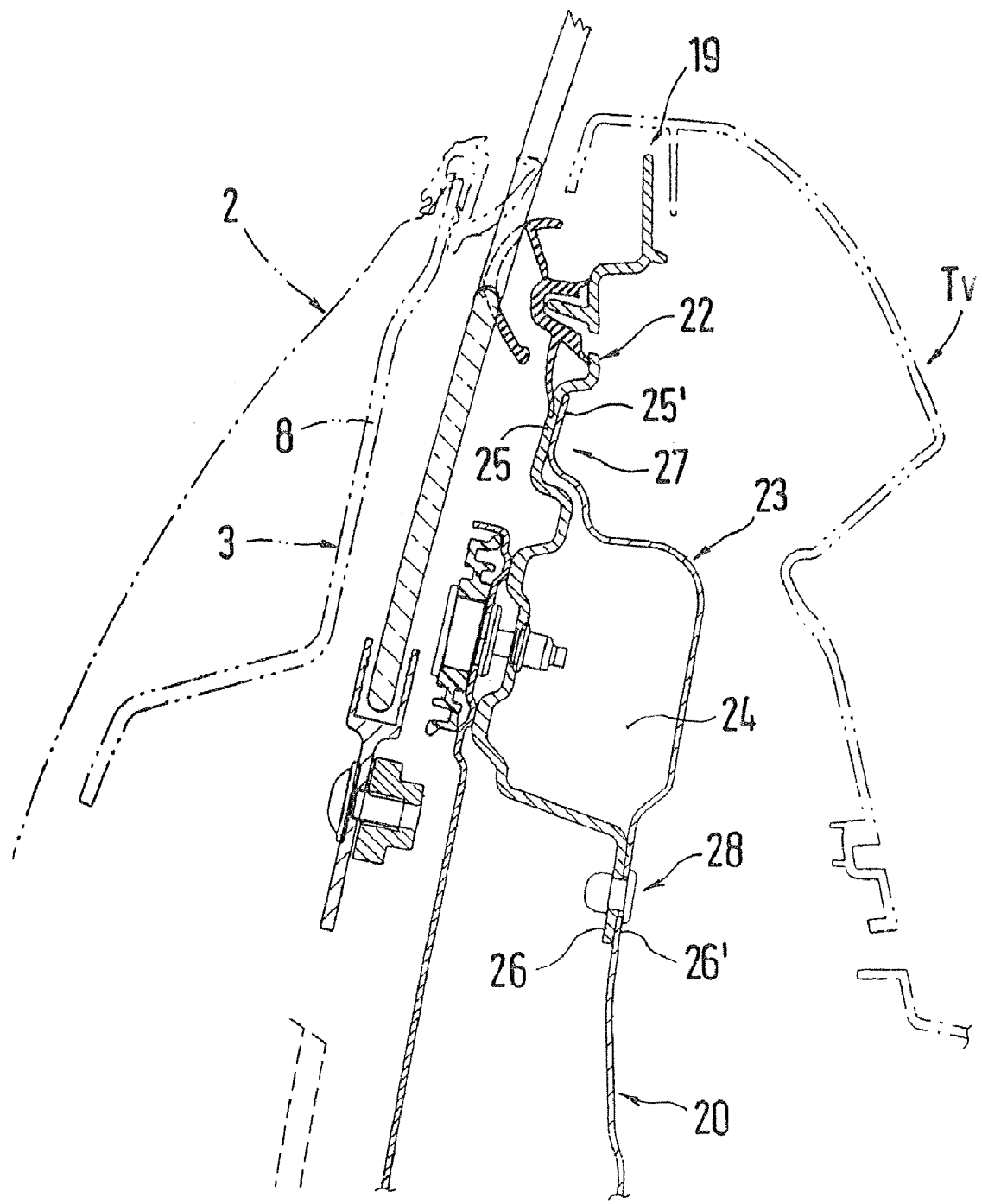
FIG. 6 is a diagrammatic, enlarged sectional view taken along the section line VI-VI shown in FIG. 3.

A lower, approximately horizontally oriented frame part 22 of the upper window frame 19 is connected to an upper border region 23 of the baking-sheet-like assembly support sheet 20 with a longitudinally running hollow support 24 being formed. For this purpose, the window frame 19 and the assembly support sheet 20 are connected to each other at unidirectional fastening flanges 25, 25' and 26, 26' via spaced-apart rivet rows 27, 28. One rivet of the lower rivet row 28 is illustrated in FIG. 6.

Figure 13:
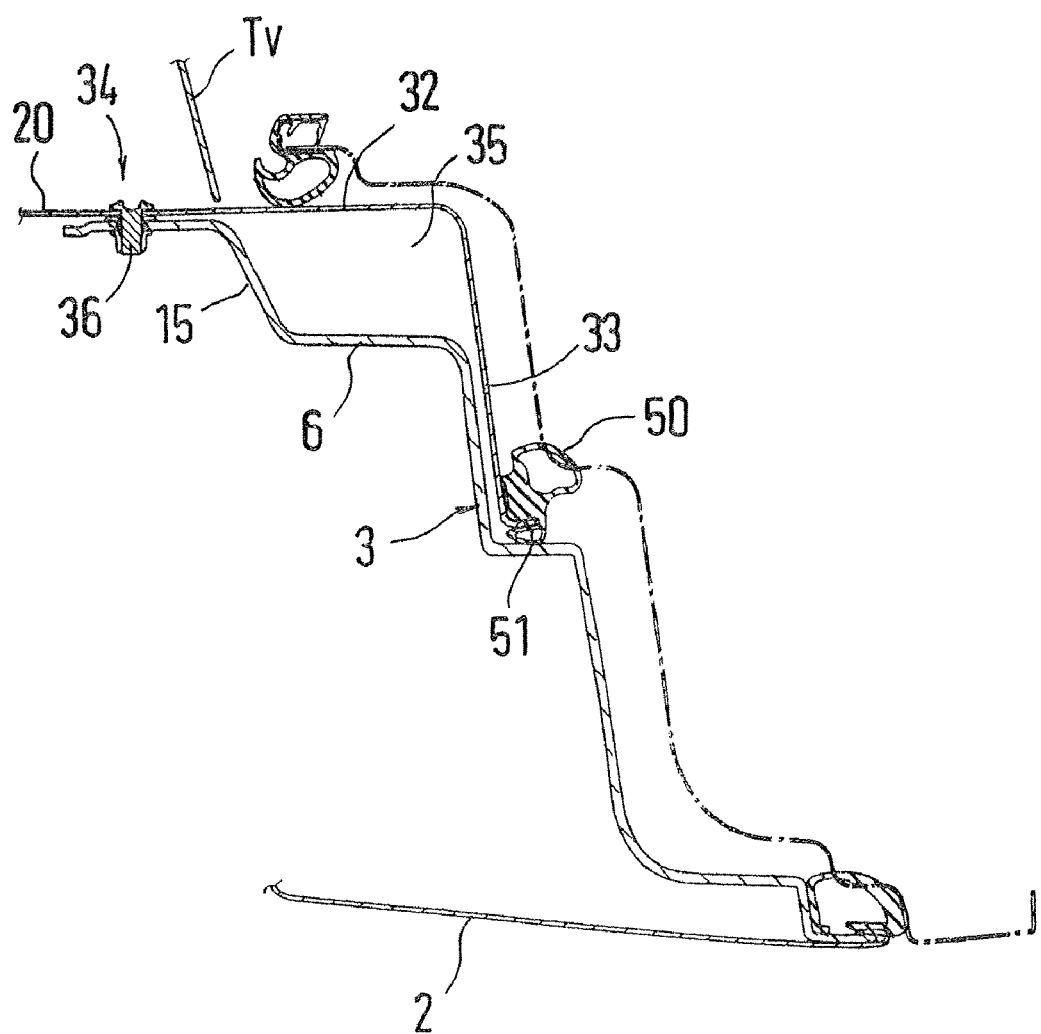
FIG. 13 is a diagrammatic, enlarged sectional view taken along the section line XIII-XIII shown in FIG. 3.

In the exemplary embodiment, the extensive, baking-sheet-like assembly support sheet 20 is formed by an aluminum alloy sheet and accommodates an entire window lifter 29 for the displacement movement of a door window pane 30, one or more speakers 31 and, if appropriate, further door assemblies. The baking-sheet-like assembly support sheet 20 has an extensive base section 32 which is provided on the border side, at least at the front, rear and bottom, with an angled portion 33 with an L-shaped profile (FIG. 13). A screw fastening 34 between the assembly support sheet 20 and inner frame part 3 takes place in the region of the base section 32, with the connecting tabs 15 which are integrally formed on the inner frame part 3 and are intended for supporting and fastening the assembly support sheet 20 being formed at least in the fastening region. Fastening screws 36 of the screw fastenings 34 for the assembly support sheet 20 are covered by the fitted interior door molding Tv.

Figure 5:
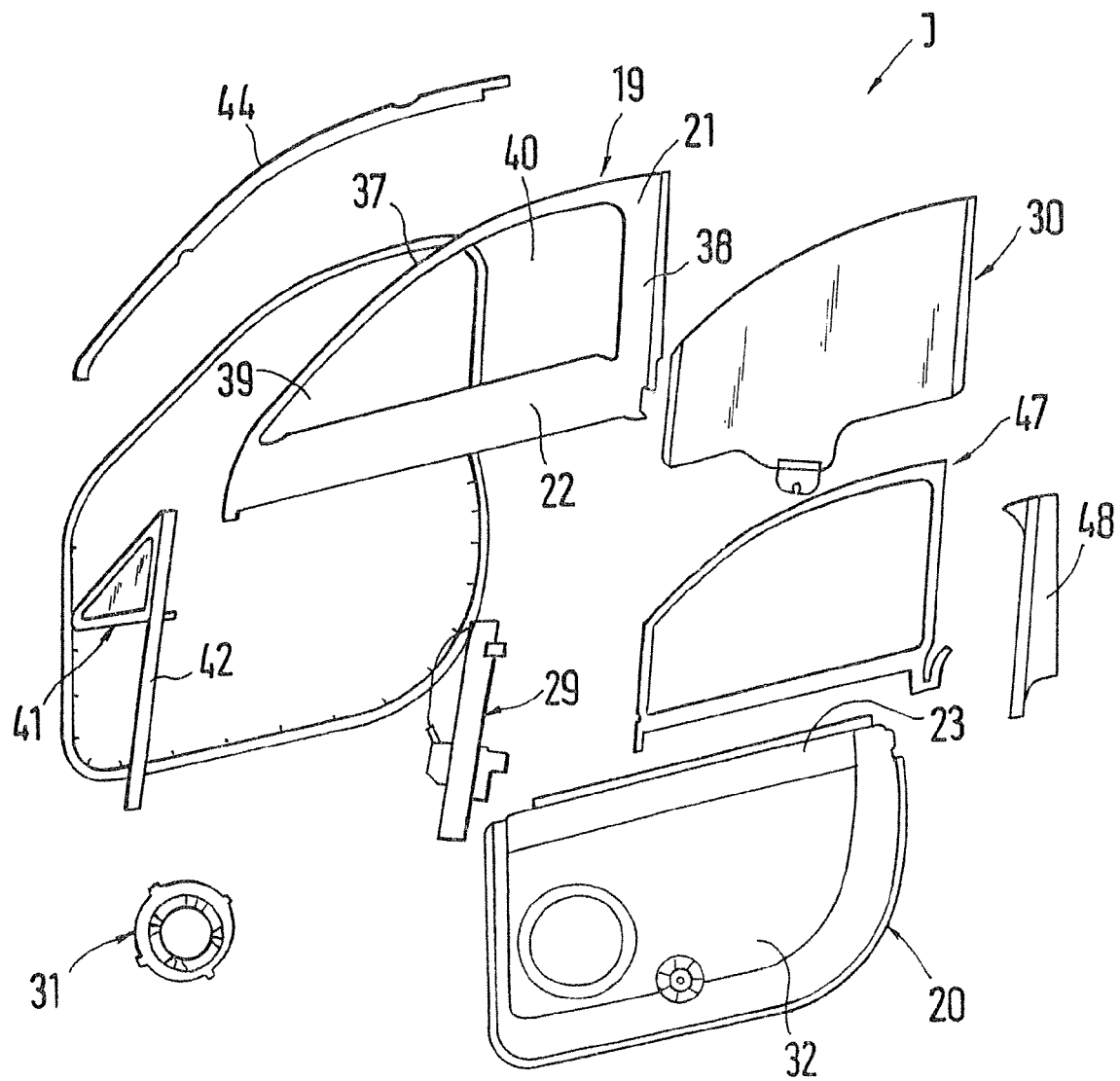
FIG. 5 is a diagrammatic, side exploded view of the individual components of the inner module.
Figure 7:
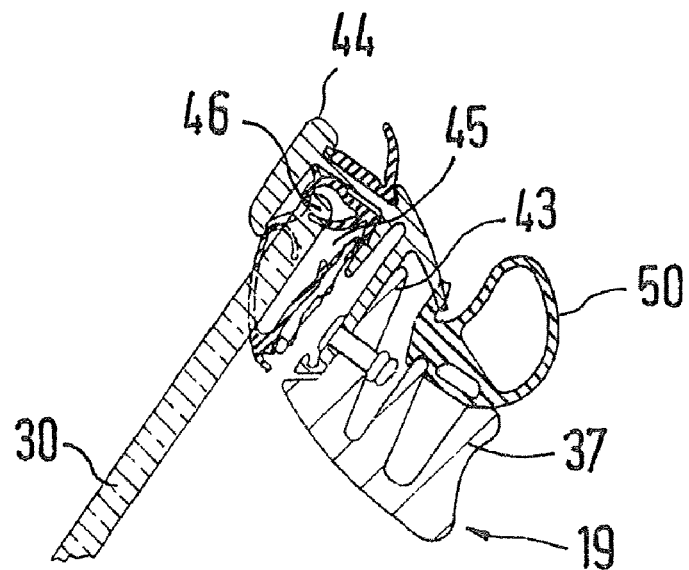
FIG. 7 is a diagrammatic, enlarged sectional view taken along the section line VII-VII shown in FIG. 3.
Figure 8:
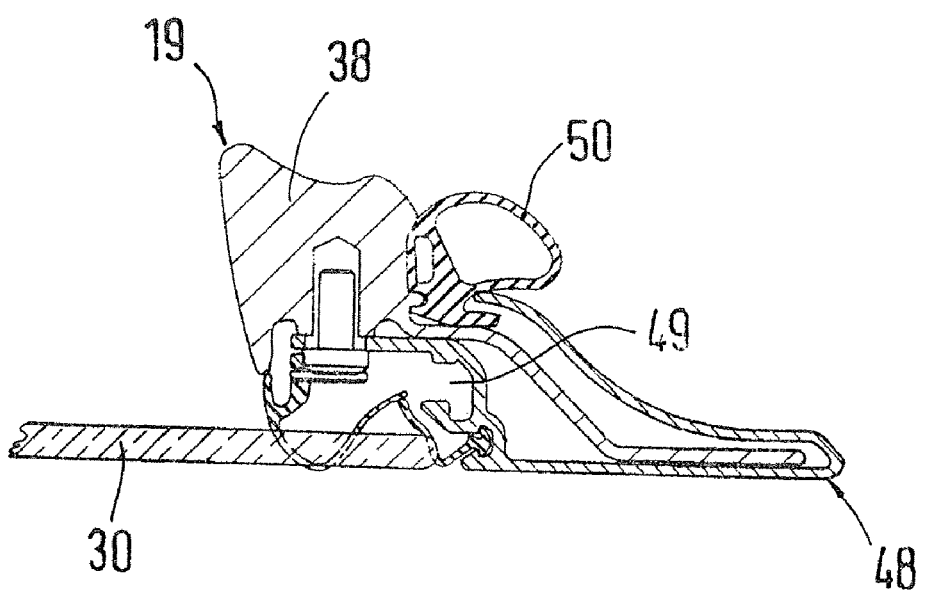
FIG. 8 is a diagrammatic, enlarged sectional view taken along the section line VIII-VIII shown in FIG. 3.

According to FIG. 5, the upper window frame 19, which is formed as a single piece, is assembled from an upper frame part 37 which runs in a curved manner, an approximately horizontally oriented, lower frame part 22 and a vertically oriented, rear frame part 38. A triangular window 41 is inserted into a front corner region 39 of an opening 40 in the window frame 19, which opening is bounded by the frame parts 37, 22, the triangular window 41 having, at its rear end, a vertically running guide rail 42 which protrudes downward beyond the window frame 19. Along the upper frame part 37 which runs in a curved manner, a decorative strip 44 is placed onto an angled web 43 of the upper frame part 37 and is locally connected to the web 43, for example by riveting (see FIG. 7). The decorative strip 44 has an approximately U-shaped, downwardly open receiving section 45 for an upper border 46 of the closed door window pane 30. A rubber or plastic frame-shaped window guide 47 is placed onto the outside of the encircling window frame 19 and is fastened thereto. A cover 48 is placed onto the outside of the rear, vertically running frame part 38 of the window frame 19, with an integrated guide rail 49 for the door window pane 30 being provided on the cover 48 (see FIG. 8). The door window pane 30 is guided flush with the outer skin on the front border via the vertically running guide rail 42 of the triangular window 41 and on the rear border via the guide rail 49 of the cover 48. In the raised position of the door window pane 30, the entire window frame 19 is completely lined by the door window pane and is not visible from the outside. An encircling door main seal 50 is fastened firstly to the upper window frame 19 and secondly to an encircling plug-on flange 51 of the assembly support sheet 20.

Figure 3:
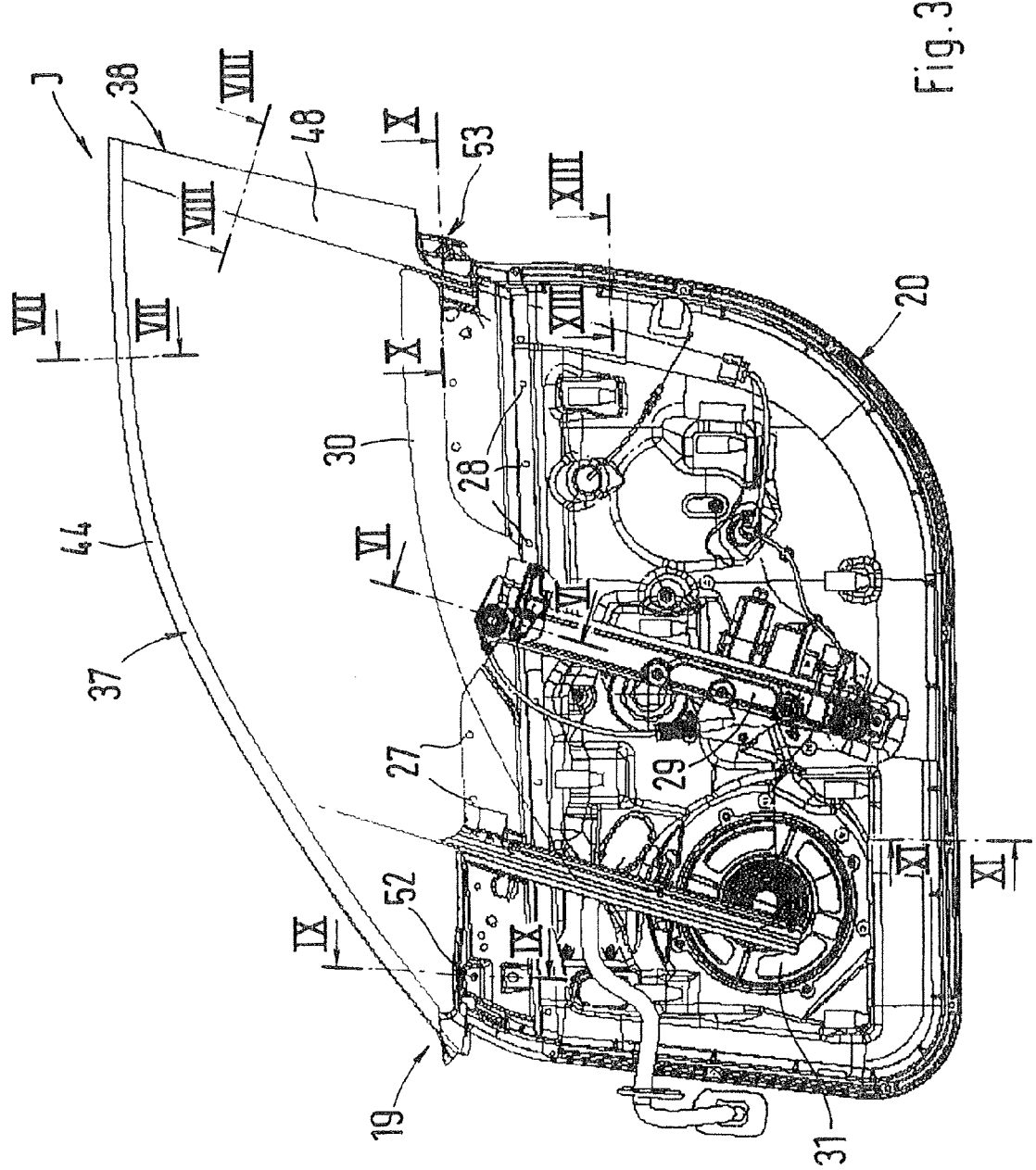
FIG. 3 is a diagrammatic, side view from the outside of the inner module of the motor vehicle door.
Figure 9:
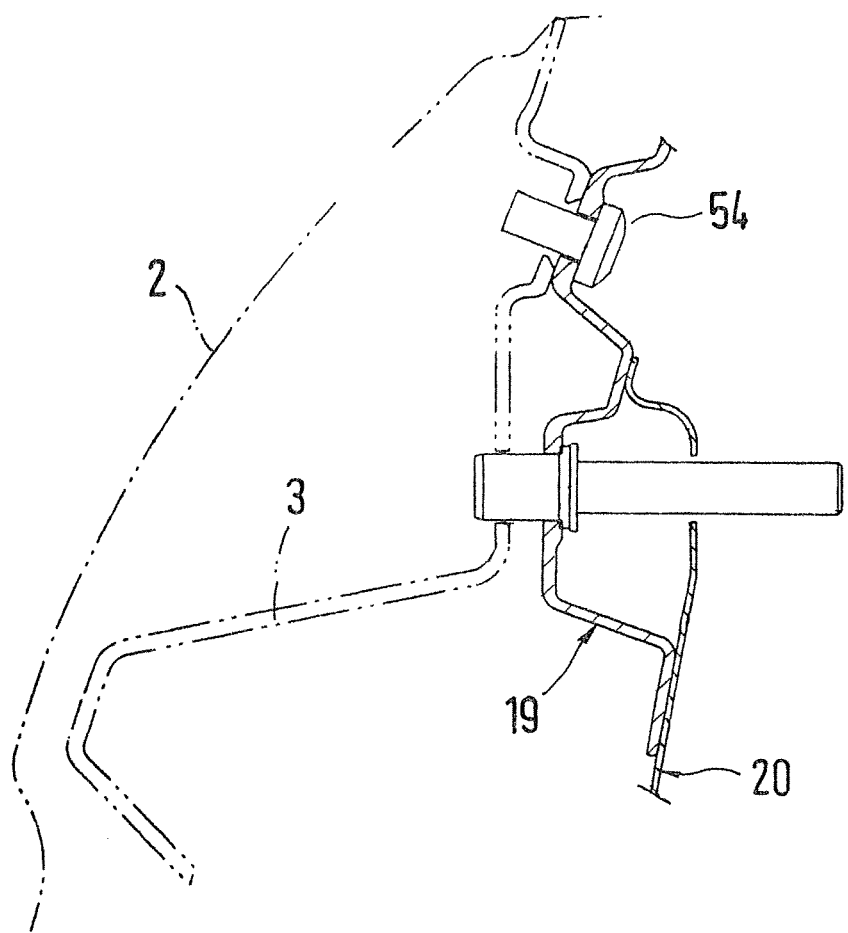
FIG. 9 is a diagrammatic, enlarged sectional view taken along the section line IX-IX shown in FIG. 3.
Figure 10:
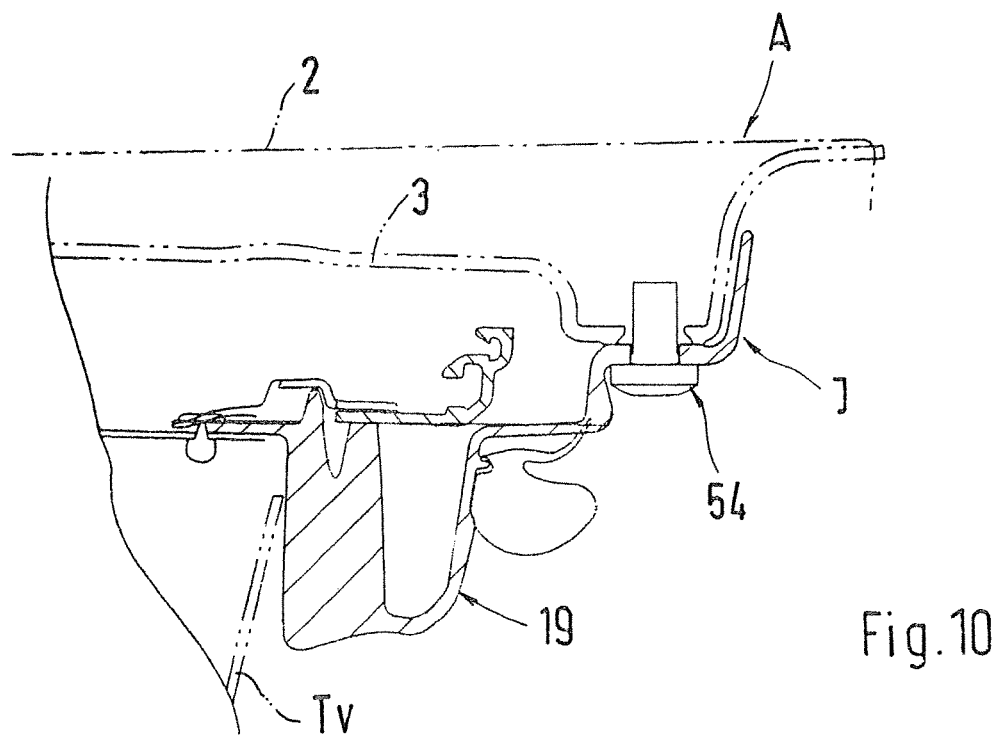
FIG. 10 is a diagrammatic, enlarged sectional view taken along the section line X-X shown in FIG. 3.
Figure 11:
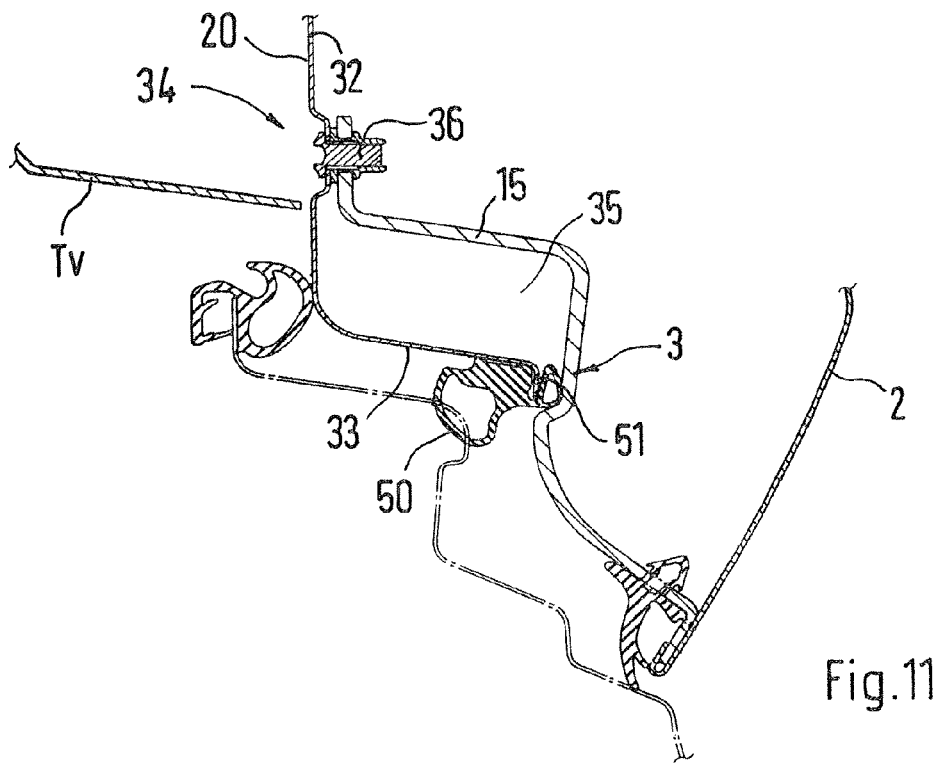
FIG. 11 is a diagrammatic, enlarged sectional view taken along the section line XI-XI shown in FIG. 3.
Figure 12:
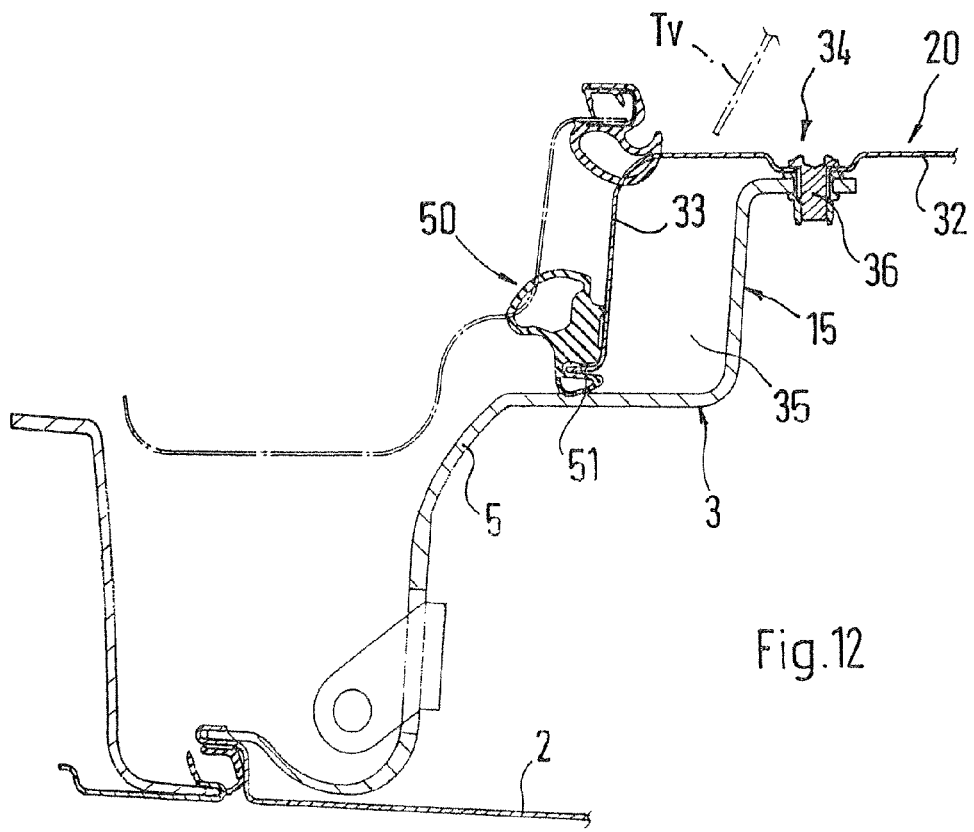
FIG. 12 is a diagrammatic, enlarged sectional view taken along the section line XII-XII shown in FIG. 3.

A particularly stiff configuration of the motor vehicle door 1 is achieved by the upper window frame 19 being connected in the region of the door breast at its front and rear ends, at 52 and 53, to the inner frame part 3 in each case via at least one releasable connecting element 54 (see FIGS. 3, 9, 10). In the exemplary embodiment, two spaced-apart connecting elements are in each case provided between window frame 19 and inner frame part 3 at 52 and 53.

The invention claimed is:

1. A motor vehicle door, comprising:
   releasable connecting elements;
   an outer module having an outer panel, an inner frame part, an impact support affixed to said inner frame part, and hinges affixed to said inner frame part, said inner frame part being a single-piece diecast part made of a metal alloy;
   an inner module connected to said outer module by one of screwing, riveting, and adhesive bonding, said inner module including:
      accommodation options for door assemblies, a window pane, a pane actuator, and speakers;
      an upper encircling window frame being a single-piece diecast part made of a metal alloy, said upper window frame connected locally to said inner frame part via said releasable connecting elements;
      a lower assembly support sheet connected to said upper encircling window frame, said lower assembly support sheet being a baking-sheet-shaped assembly support sheet having an upper border region; and
      said upper encircling window frame having a lower frame part connected to said upper border region of said lower assembly support sheet and defining a longitudinally running hollow support between said lower frame part and said upper border region.

2. The motor vehicle door according to claim 1, wherein said inner frame part is manufactured from material selected from the group consisting of an aluminum alloy and a magnesium alloy.

3. The motor vehicle door according to claim 1, wherein said inner frame part has integrated receptacles for at least one of a door lock, door hinges, and said impact support.

4. The motor vehicle door according to claim 1, wherein said inner frame part has locally angled connecting tabs for supporting and fastening said assembly support sheet.

5. The motor vehicle door according to claim 1, wherein said upper encircling window frame is formed by a diecast part made of a magnesium alloy.

6. The motor vehicle door according to claim 1, wherein:
   said upper encircling window frame has an opening formed therein; and
   said inner module further having a triangular window with a vertical guide rail inserted into said opening in said upper encircling window frame and connected to said upper encircling window frame.

7. The motor vehicle door according to claim 1, wherein:
   said upper encircling window frame has an upper frame part with a web; and
   said inner module further having a decorative strip running along said upper frame part and connected to said web of said upper frame part.

8. The motor vehicle door according to claim 1, wherein said upper encircling window frame has a profiled rear frame part;
   said inner module further having a door window pane; and
   said inner module further having a cover having an integrated guide rail for receiving said door window pane, said cover being disposed flush with an outer skin and is placed onto said profiled rear frame part of said window frame.

9. The motor vehicle door according to claim 1, wherein said upper border region of said assembly support sheet is connected via two spaced-apart rivet rows to a horizontally oriented, said lower frame part of said window frame for defining said longitudinally running hollow support.

10. The motor vehicle door according to claim 1, further comprising:
    an interior door molding; and
    fastening screws, said assembly support sheet is connected to said inner frame part via said fastening screws, said fastening screws being disposed at a distance from an outer border of said assembly support sheet and being covered by said interior door molding.

11. The motor vehicle door according to claim 1, wherein said outer panel is formed by a sheet of aluminum alloy being approximately 0.8 to 1.5 mm thick, said outer panel having a border side connected to an outer border of said inner frame part by one of crimping and adhesive bonding.

* * * * *